United States Patent [19]
Gfeller et al.

[11] 4,214,807
[45] Jul. 29, 1980

[54] HOLOGRAPHIC OPTICAL SATELLITE COMMUNICATION SYSTEM

[75] Inventors: Fritz Gfeller, Adliswil; Daniel Wild, Kilchberg, both of Switzerland

[73] Assignee: International Business Machines Corporation, Armonk, N.Y.

[21] Appl. No.: 937,352

[22] Filed: Aug. 28, 1978

[30] Foreign Application Priority Data

Sep. 27, 1977 [CH] Switzerland ............ 11757/77

[51] Int. Cl.$^3$ .................................. G02B 5/32
[52] U.S. Cl. .................. 350/3.73; 350/3.61; 350/3.75; 455/608; 455/609; 455/618
[58] Field of Search ............ 250/199; 350/3.61, 3.64, 350/3.72, 3.73, 3.75, 3.77, 3.85, 3.86

[56] References Cited
U.S. PATENT DOCUMENTS

| | | | |
|---|---|---|---|
| 3,615,123 | 10/1971 | Wuerker | 350/3.77 |
| 3,635,538 | 1/1972 | Caulfield et al. | 350/3.64 |
| 3,795,768 | 3/1974 | Locke | 358/2 |
| 3,941,450 | 3/1976 | Spitz et al. | 350/3.73 |
| 3,985,975 | 10/1976 | Steensma | 350/3.77 X |
| 4,017,144 | 4/1977 | Staebler | 350/3.61 |
| 4,055,423 | 10/1977 | Bartolini et al. | 350/3.61 X |
| 4,076,371 | 2/1978 | Braun et al. | 350/3.61 |

OTHER PUBLICATIONS

Kogelnik, "Hologram Efficiency and Response", *Laser Technology Section*, Nov. 1967, pp. 68–73.
Checcacci et al., "Holographic Antennas", *Proc. of IEEE*, Dec. 1968, pp. 2165–2167.
Chen, "Modulators for Optical Communications", *Proc. of IEEE*, vol. 58, No. 10, Oct. 1970, pp. 1440–1457.
Ross et al., "Earth Orbital High Data Rate Pulsed Visible Laser Communications", Eascon Conf., Oct. 1970, pp. 86–97.
Mintz et al., "Holographic Simulation of Parabolic Mirrors", *Applied Optics*, vol. 14, No. 3, Mar. 1975, pp. 564–565.
Pole et al., "Holographic Laser Beam Deflector", *Applied Optics*, vol. 14, No. 4, Apr. 1975, pp. 976–980.
Abramson et al., "Satellites:Not Just A Big Cable in the Sky", *IEEE Spectrum*, Sep. 1975, pp. 36–40.
Bryngdahl et al., "Laser-Beam Scanning Using CGH's", 1975 Annual Mtg., Optical Soc. of America, Oct. 1975, p. 1224 FI18.
Barry et al., "1000-Mbits/s Intersatellite Laser Communication System Technology", *IEEE Trans. on Commun.*, Apr. 1976, pp. 470–478.
Barry, "1-GBPS Space Laser Communications System", Eascon Conf., Sep. 1976, pp. 134-A to 134-G.
Comsat, 1976 Report, Sect. 4.4, 4.5, pp. 4–59 to 4–68 and 4–87 to 4–88, 1976.
Sincerbox, "Formation of Optical Elements by Holography", *IBM Tech. Discl. Bull.*, vol. 10, No. 3, Aug. 1967, pp. 267–268.

*Primary Examiner*—John K. Corbin
*Assistant Examiner*—Lee, John D.
*Attorney, Agent, or Firm*—John B. Frisone

[57] ABSTRACT

In a satellite communication system using optical carriers the down link radiation beam pattern is limited to illuminating only the receiver sites for power economy. The transmitting laser's beam pattern is shaped in such a way that the intensity distribution at the earth surface is adapted to the geographical distribution of the receiving stations. A suitably prepared hologram or set of stacked holograms storing different beam patterns is interposed in the radiation path. The antenna characteristic may be varied by selecting a particular hologram. This is accomplished by changing the beam angle of incidence by remote control.

9 Claims, 2 Drawing Figures

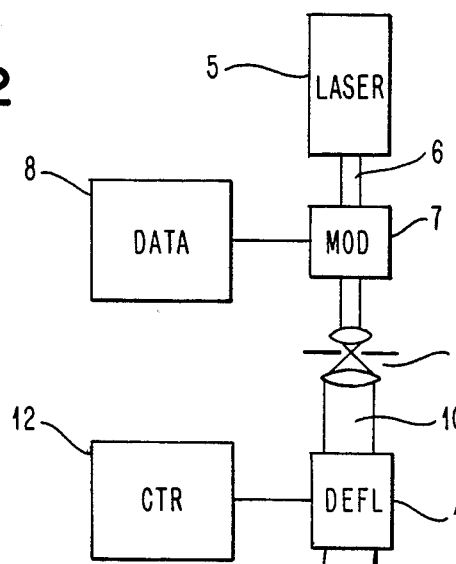
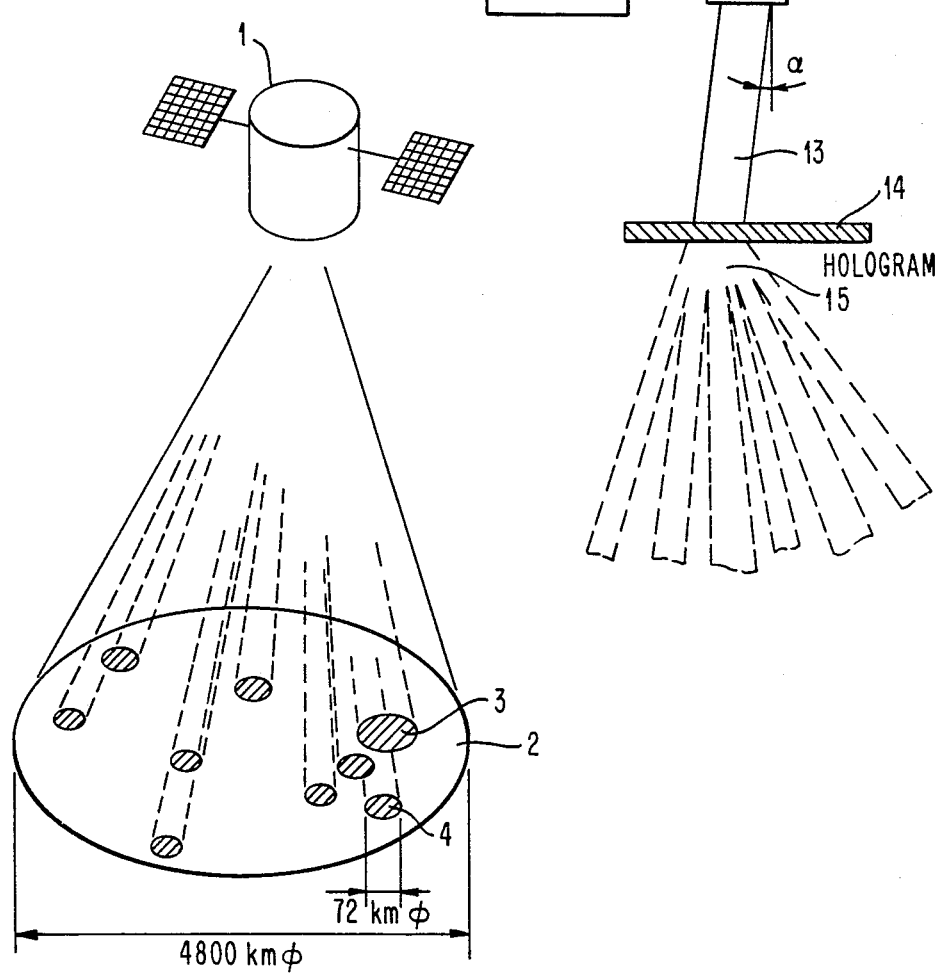

HOLOGRAPHIC OPTICAL SATELLITE COMMUNICATION SYSTEM

DESCRIPTION

1. Field of the Invention

The invention relates to a satellite communication system with carrier frequencies in the optical range, comprising at least a transmitting laser which provides at least one directional beam connection to an earthbound receiver site, whereby according to the number of connections wanted the radiation diagram is adjustable with respect to the beam directions selected and to the permitted beam spread.

2. Description of the Prior Art

Most satellites suitable for use in communication systems move in synchronism with the earth's rotation in a so-called geostationary orbit above the earth's equator. But the principles of the invention can be applied analogously to all communication systems from outer space to earth, even if the course of the satellite or other spacecraft differs from such an orbit or when the connection to the earthbound receiver site is possible only in selected time intervals. In a 24-hour orbit a satellite has an altitude of about 35,800 km. If, in addition, its orbit plane extends perpendicularly to the earth's axis within the earth's equatorial plane, it appears to stand still because it moves synchronously with the earth's rotation. Geostationary orbits are therefore possible only above the earth's equator.

To facilitate the connection of one earthbound radio station to another, a communication satellite includes at least a transponder whose receiver receives the signal transmitted by the first radio station on earth and which modulates its transmitter operating in another frequency range for relaying the received signal to a second radio station on earth. Presently communication satellites operate at carrier frequencies in the range of decimeter waves. At present the up link to the satellite uses frequencies in the range of 6 GHz while the down link uses 4 GHz. Other frequency ranges in use are 12 or 14 GHz, respectively. The power available on a satellite is limited and in order to utilize it efficiently, it should not radiate into the whole solid angle but only in those directions where a receiver site is situated. A larger or smaller solid angle has to be illuminated according to the areas of the earth's surface that must be reached. For instance, to cover the United States of America the diameter of the area covered is 4,800 km. For such a directional beam connection the beam spread angle is about 58 mrad or 3.3°. To reach single stations or a smaller area with neighboring stations a smaller beam spread angle is sufficient. If the earth stations to be covered are spread over a larger area, several directional beam connections to single stations may be more favorable with respect to the power needed rather than the illumination of a whole continent. However, such a solution to the power problem requires a versatile and costly antenna installation to implement all these single connections. The cost increases considerably if it is desired to dynamically alter the antenna diagram of the installation to accommodate changing operation conditions. In the commonly used microwave range this problem is from a practical point of view not solvable.

For communications a larger usable bandwidth can be expected in the higher frequency ranges. For good receiving conditions from space the earth's atmosphere is transparent to electromagnetic radiation, not only in the so-called radio window, i.e., in the GHz-range, but especially to radiation in the optical range. In the future satellite communication systems can be expected with carrier frequencies also in the optical range. A publication of interest in this regard is the paper "1000-Mbits/s Intersatellite Laser Communication System Technology," by J. D. Barry et al in IEEE Transactions on Communications, April 1976, pages 470 through 478. The system described uses a transmitting laser operating in the infrared region at 1.06 $\mu$m wave length whose frequency is doubled optically to 563 THz corresponding to a wave length of 0.53 $\mu$m in the green visible range. Laser beams are especially suitable for directional beam connections because they are less divergent and they can easily be focused and directed by optical means.

An antenna installation must be very sophisticated if it is to provide a multi-beam radiation pattern for simultaneously serving a number of directional connections. In the microwave range technical solutions exist like parabolic, horn or lense antennas which should be individually mechanically adjustable for this purpose. There also exist multi-beam antennas with controllable radiation diagrams like phased arrays which could be used. However, in a satellite application they are unsuitable due to the weights involved and because they require more electrical power for their operation which is not generally available on the satellite.

Such antenna installations usable in the optical range may be constructed using mirrors or lense systems that are mechanically adjustable with respect to the beam direction. In addition, they should provide for adjusting the divergence of the beams individually or for adjustment of the angular aperture of the corresponding cones of light.

To minimize weight one could use, e.g., lighter optical means with comparable properties instead of mechanically adjustable parabolic mirrors. For instance, in the paper, "Holographic Simulation of Parabolic Mirrors," by G. D. Mintz et al in *Applied Optics*, volume 14, no. 3, March 1975, pages 564 and 565, the use of holograms in lieu of parabolic mirrors in a spacecraft is disclosed. In a communication satellite such an installation would be usable at the most for a single directional connection. A more sophisticated antenna radiation pattern for many different connections to a larger number of earth stations needs, however, also a larger number of individually controllable holographic mirrors. Such an installation would be expensive to implement.

Rotating holograms may be used to generate flying spots for scanning apparatus. U.S. Patent 3,795,768 describes an apparatus using a rotating plane reflective hologram. The generation of scanning spots with a cylindrical rotating transmissive hologram is described in the paper, "Holographic Laser Beam Deflector," by R. V. Pole and H. P. Wollenmann in *Applied Optics*, Volume 14, No. 4, April 1975, pages 976 through 980.

Holograms are true records of coherent wave distributions with respect to amplitude and phase. In a section of a plane surface enclosing the coherent radiation source, they show the interference pattern of the wavefronts created by an object radiation and by a reference radiation. By interaction with an illumination similar to the reference radiation the original object radiation can be reproduced as a reconstruction of the wavefield by diffraction from the interposed hologram. A most simple wavefield is used as reference radiation or as illumination for the reconstruction, respectively, like a plane wave or a spherical wave which can be reproduced easily. Usually a hologram is fabricated by a suitable exposure technique of the object to be imaged. But in many cases it is possible to calculate interference patterns of a given or an intended wave distribution with a reference radiation and to generate synthetic holograms according to these calculated values. With this method it is also possible to enhance the diffraction patterns of certain orders artificially.

Generally holograms including such synthetic interference patterns for the wavefront reconstruction of the wavefield from an illuminating coherent radiation can be of several different types which are used in transmission or in reflection. Like diffraction gratings according to their structure they can have an effect on the phase of the incident radiation, on the amplitude of the radiation, or on both simultaneously. In their surface, which is mostly a plane, the transmission factor, the absorption factor, or the refractive index vary locally according to the interference pattern intended. So-called thin holograms can be fabricated easily; however, their efficiency is relatively low. The reproduction radiation is utilized most efficiently to reconstruct the wavefronts in the so-called thick holograms or volume holograms. In this regard, reference is made, e.g., to a paper, "Hologram Efficiency and Response," by Herwig Kogelnik, Laser Technology Section, November 1967, pages 68 through 73.

SUMMARY OF THE INVENTION

The invention relates to a satellite communication system with carrier frequencies in the optical range. The satellite transponder comprises at least a transmitting laser including means for establishing directional connections to earth stations whereby the radiation pattern is adjustable according to the number of connections wanted with respect to the beam directions and to the individual beam spread angles.

The invention is characterized in that there is provided at least a hologram interposed in the transmitting laser's optical path utilizing the incident laser beam as a reference radiation source to generate therefrom the desired multiple beam transmitter radiation pattern.

Thus it is possible to illuminate the desired earth stations individually and in a controlled manner. Therefore, the power which is available on board of a satellite is economically handled. The installation is extremely uncomplicated and low in weight. The radiation diagram of the optical transmitter can be adjusted to different situations, if according to a further feature of the invention, a number of different holograms are provided in the satellite to generate different radiation patterns. As required, either of these holograms can be activated by remote control. The radiation of the transmitting laser serves both as an optical carrier of the coded information and simultaneously also as the illumination radiation for the formation of the antenna diagram by diffraction at the hologram. Each hologram stored for the generation of an intended multi-beam radiation pattern is actuated by the illuminating radiation of the transmitting laser which is incident under a certain angle. The angle of incidence of the laser radiation onto the holograms is adjustable to actuate selectively one of these holograms according to a further feature of the invention. To this end, a deflector is provided between the laser and the volume hologram or a stack of thin holograms. For instance, it can be an acousto-optical deflector or an electro-optical deflector; however, electro-mechanically adjustable members are also suitable as remote controlled deflectors in the optical path of the laser. For changing the frequency range or as spare parts several lasers may be provided in a satellite which can be selectively switched on.

BRIEF DESCRIPTION OF THE DRAWINGS

FIG. 1 shows schematically a satellite communicating with a number of earth stations in an area of the earth's surface.

FIG. 2 shows the satellite communication system according to the invention in a block diagram.

DESCRIPTION OF THE PREFERRED EMBODIMENTS

In FIG. 1 a satellite 1 is located above an area 2 of the earth's surface which is to be supplied with radio transmissions. If such an area comprises, for instance, the United States of America, its diameter or the short axis of the ellipse, respectively, must be at least 4,800 km. To illuminate an area of such dimension completely the spread angle of the light cone is about 58 mrad or 3.3° from the axis to the cone's surface. To adequately cover this area, a pulse power is needed at the optical transmitter in the order of magnitude of about 20 kW. Considerably less pulse power is sufficient for directional connections aimed at individual earth stations neighboring, e.g., in a smaller circle 3. Single earth stations can be covered by still smaller circles 4 having a minimum diameter of about 72 km. Smaller values would be unsuitable if they impose too high a criteria for the position stabilization of the satellite. Beam spot diameters of 72 km can be reached sufficiently well with rotationally stabilized satellites, i.e., with a satellite whose position is stabilized about one axis. However, a sharper concentration of the beam requires a sophisticated position stabilization of the satellite about 3 axes. But for an individual directional connection as described above, the required pulse power of the optical transmitter lies in the order of magnitude of 4.5 W only.

FIG. 2 is a block diagram of the invention. A laser 5 is the radiation source of the optical transmitter. Its emerging sharp laser beam 6 passes through a modulator 7 which is connected to a suitable data source 8. A telecentric optical system 9 expands the beam parallelly. The emerging expanded laser beam 10 passes through a deflector 11 which receives control signals for its activation by a control means 12. The angle of incidence $\alpha$ is adjusted by the deflector 11. The angle $\alpha$ is the angle of incidence of the deflected and expanded laser beam 13 with respect to a hologram 14. By diffracting the incident laser radiation at the hologram 14 the wavefronts are reconstructed forming the desired field of the multi-beam radiation pattern. In this way an optical antenna diagram of the optical transmitter can be generated effecting the desired local distribution of the transmitter power into individual directional connections to selected earth stations.

As reference radiation, preferably the laser radiation used is the field of a plane wave incident on a volume hologram or an a stack of thin holograms to reconstruct the wavefronts of the antenna diagram. The angle of incidence $\alpha$ determines which of the holograms will be reproduced. Every such hologram controls the beam directions according to the number of communications desired and each individual directional beam forms a specific beam spread angle of the light cone. When the earth stations are widely spaced apart, the saving of transmitter power is considerable compared to the global illumination of a larger area of the earth's surface otherwise needed. Different possible radiation patterns can be provided in this manner so that, e.g., at weather originated bad receiving conditions of a certain earth station another hologram can be selected by remote control which compensates by providing more beam power for this directional connection. Possibly this can occur at the expense of other directional connections with better receiving conditions if the net transmitter power is not exceeded. At the time of launch additional holograms for planned extensions of the earth stations network can be included and later selected to provide beam coverage to newly added earth stations.

The deflector used can be an acousto-optical or an electro-optical deflector for adjusting the angle of incidence of the laser radiation for selectively actuating a hologram; however, equivalent means can be provided such as an adjustable electro-mechanical mirror.

A thin transmissive phase hologram can be used in the optical path of the laser. Holograms usable in the visible range are mostly formed of photosensitive film. When the laser radiation lies in the infrared range of the spectrum, photographic layers are not sensitive enough. In this case one can fabricate the hologram successfully of semiconductor chips of germanium or silicone which are transparent in the infrared range. The semiconductor chip thickness varies locally according to the interference pattern etched. Such a pattern can be calculated according to the satellite position and the geographical distribution of the earth stations. One can fabricate synthetic holograms after such calculations. The interference pattern can be made fine enough because the resolution of modern photolithographic techniques is better than at least one order of magnitude as the wave length of the laser radiation used. The so-called thick phase holograms whose thickness is greater than the wave length of the laser light used are more efficient. Practically, the whole incident radiation can be used for the wave front reconstruction of the multi-beam radiation diagram of the optical transmitter due to the multiple interference with lattice planes of the crystal. Therefore, no radiation power of the transmitting laser is lost for the reconstruction of the antenna diagram. This applies for transmissive holograms as well as for reflective holograms. Multiple storage of different holograms is possible in volume holograms in such a way that for the exposure of each object a different angle of incidence is chosen for the reference radiation. In the case of front reconstruction the angle of incidence selected for the illuminating radiation also selects the respective hologram. If the holograms are made individually like, e.g., synthetic holograms, the individual dielectric layers of the holograms are stacked together in a single block so that the whole arrangement may be comparable to an optical interference filter.

An estimate of the antenna gain due to the new satellite communication system is possible by comparing the illumination of a subcontinent of the size of the United States of America with the size of individual areas covered for a number of single directional connections. It should be based on the same tolerances as used in the example above for the beam divergence. As a further parameter the efficiency of the hologram interposed in the optical path is considered. Then it can be shown that the antenna gain is 22 dB with an assumed hologram efficiency of 100% to reach 27 earth stations. If the efficiency decreases to only 60%, the antenna gain is still 20 dB and even with a hologram efficiency of only 30% the gain is still 17 dB.

While the invention has been particularly shown and described with reference to preferred embodiments thereof, it will be understood by those skilled in the art that various changes in form and details may be made therein without departing from the spirit and scope of the invention.

Having thus described our invention, what we claim as new, and desire to secure by Letters Patent is:

1. A satellite communication system provided with an optical carrier comprising:

a transmitting laser for supplying at least one laser beam, a data source, modulation means responsive to the data source and the laser beam for modulating a physical characteristic of the laser beam in accordance with the data content of the data from the data source, a laser beam deflection means responsive to the modulated laser beam for deflecting said beam from a datum position in a predetermined controlled manner, and holographic means positioned in a predetermined manner with respect to said datum position for utilizing the incident laser beam as a reference radiation source to generate therefrom a predetermined multiple beam transmitter radiation pattern.

2. A system according to claim 1, characterized in that the holographic means is a thin transmissive phase hologram interposed in the laser's optical path.

3. A system according to claim 2, characterized in that the holographic means consists of a semiconductor chip with locally varying thickness and the beam supplied by the laser is in the infra-red region.

4. A system according to claim 3, characterized in that the semiconductor chip is made of germanium whose surface is etched according to a respective pattern.

5. A system according to claim 3, characterized in that the semiconductor chip is made of silicon whose surface is etched according to a respective pattern.

6. A system according to claim 1, characterized in that the holographic means is a thick transmissive phase hologram interposed in the laser's optical path.

7. A system according to claim 1, characterized in that the holographic means is a thick reflective phase hologram interposed in the laser's optical path.

8. A system according to claim 1, characterized in that the holographic means includes a plurality of individual holograms for generating different multi-beam radiation patterns from which one hologram is selectively actuable at a time.

9. A system according to claim 8, characterized in that the laser beam's angle of incidence upon said holograms is controlled by said deflection means for selecting one of said plurality of holograms.

* * * * *